Oct. 21, 1958          H. H. DETAMORE ET AL          2,857,007
              FLUID PRESSURE CONTROL SYSTEM
              FOR VARIABLE PITCH PROPELLERS
Filed Jan. 6, 1954                                 3 Sheets-Sheet 1

INVENTORS
Harold H. Detamore
Walter D. Eby
BY Dale W. Miller
Richard E. Moore

Craig V. Morton
Their Attorney

INVENTORS
Harold H. Detamore
Walter D. Eby
Dale W. Miller
Richard E. Moore
BY
Craig V. Morton
Their Attorney

United States Patent Office 2,857,007
Patented Oct. 21, 1958

2,857,007

FLUID PRESSURE CONTROL SYSTEM FOR VARIABLE PITCH PROPELLERS

Harold H. Detamore, Frederick, Md., and Walter D. Eby, Dayton, and Dale W. Miller, Brookville, Ohio, and Richard E. Moore, Los Angeles, Calif., assignors to General Motors Corporation, Detroit, Mich., a corporation of Delaware Application January 6, 1954, Serial No. 402,440

14 Claims. (Cl. 170—135.27)

This invention pertains to fluid pressure control systems for variable pitch propellers, and more particularly to a fluid pressure control system for variable pitch propellers of the dual, or contra-rotation type.

Among our objects are the provision of a fluid pressure governing system for effecting a rate of blade angle correction proportional to the amount of speed error and to the rate of change of speed error; the further provision of a fluid pressure pitch controlling system wherein a single actuator is employed to control the blade angle changes of both the inboard and outboard propeller elements; the further provision of a pitch controlling system including means for locking the propeller blades against pitch changes in the decrease blade angle direction upon a loss of system pressure; and the still further provision of a fluid pressure system for controlling a variable pitch propeller including means constituting flight and ground low pitch stops.

The aforementioned and other objects are accomplished in this invention by providing actuator control means which operate in a relatively low fluid pressure system, and pitch adjusting means which operate in a relatively high fluid pressure system. Specifically, the governing means is constituted by a valve assembly having two relatively movable elements, and a servo-motor comprising a piston and cylinder. One of the valve elements is responsive to centrifugal force, and, hence, the speed of propeller rotation. The centrifugally actuated valve element controls the flow of low pressure fluid to one side of the servo-motor piston, the other side of which is exposed to a constant pressure. The piston, in turn, controls the position of the other valve element through a mechanical linkage.

Each propeller element has associated therewith a relatively high fluid pressure system, which includes a control valve for applying pressure fluid to the blade adjusting torque units. The control valves of each propeller element are positioned by a common blade angle actuator through suitable mechanical linkages. In addition, each propeller element has associated therewith a feedback mechanism which follows up the blade movement and repositions its respective control valve to stop the flow of fluid to and from the torque units when the blade angle adjustment dictated by the actuator has been accomplished. Fluid flow to the blade angle actuator is controlled by the governing means, in the speed governing regime, and by a selector valve assembly in the other regimes of propeller operation, as will appear more fully hereinafter. In the speed governing regime of propeller operation, fluid flow to and from the actuator as controlled by the centrifugally responsive valve element is acceleration sensitive, i. e. proportional to the rate of change of speed error, while fluid flow to and from the actuator controlled by the other valve element is speed sensitive, i. e. proportional to the amount of speed error.

A manually operable pilot's control lever is provided to enable selection of the regime of propeller operation, whether it be constant speed, negative blade angle control, or feathering. In the constant speed regime of operation, dual low pitch stop means of the general type disclosed and claimed in copending application, Serial No. 269,672, filed February 2, 1952, in the name of Dale W. Miller et al., now Patent No. 2,798,563 are operative to limit the minimum low blade angles obtainable. Moreover, each pitch adjusting fluid pressure system includes pitch lock means of the type generally shown in copending application Serial No. 276,836, filed March 15, 1952, in the name of Dale W. Miller et al., which prevent the blades from moving in the decrease pitch direction in the event of loss of system pressure.

Further objects and advantages of the present invention will be apparent from the following description, reference being had to the accompanying drawings wherein a preferred embodiment of the present invention is clearly shown, and wherein like parts are denoted by like numerals throughout the several views.

Figures 1, 2:
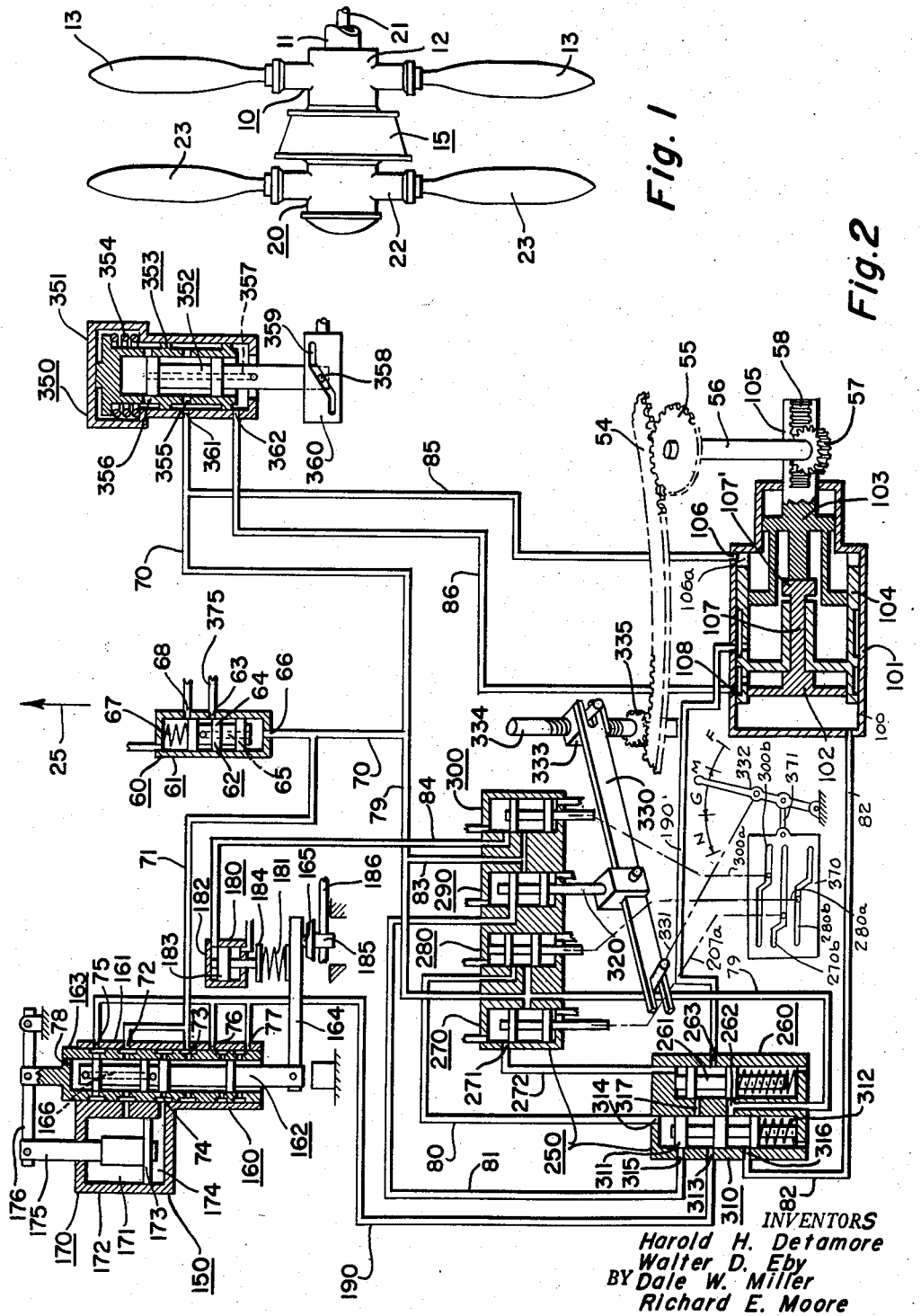
Fig. 1 is a fragmentary view, in elevation, of a contra-rotating propeller assembly embodying the fluid pressure system of this invention.
Fig. 2 is a schematic view of the governing and blade angle actuator control mechanism embodied in the fluid pressure system of this invention.

With particular reference to Fig. 1, the fluid pressure system of this invention is particularly adapted for the control of variable pitch propellers of the contra-rotation type which include an inboard propeller element 10 and an outboard propeller element 20, which elements are rotated in opposition directions by a pair of coaxial shafts 11 and 21. The inboard propeller element 10 includes a hub 12 connected to rotate with the shaft 11, the hub 12 including a plurality of radially extending blade sockets, within which propeller blades 13 are journaled for rotation about their longitudinal axes. The outboard propeller element 20, likewise, includes a hub 22, which is connected to rotate with the shaft 21, the hub 22 having a plurality of radially extending blade sockets adapted to receive and rotatably journal blades 23. As shown in Fig. 1, the dual rotation propeller is of the type disclosed and claimed in copending application, Serial No. 404,346, filed January 15, 1954, in the name of Harold H. Detamore et al., and owned by the assignee of this invention, in which only a single regulator 15 is employed. The regulator 15 contains two control units, one of which rotates with the inboard propeller element 10 and the other of which rotates with the outboard propeller element 20. A common oil reservoir supplies both the inboard and outboard control units of the regulator, which oil is placed under pressure by propeller driven pumps and employed in the fluid pressure system of this invention.

Figure 3:
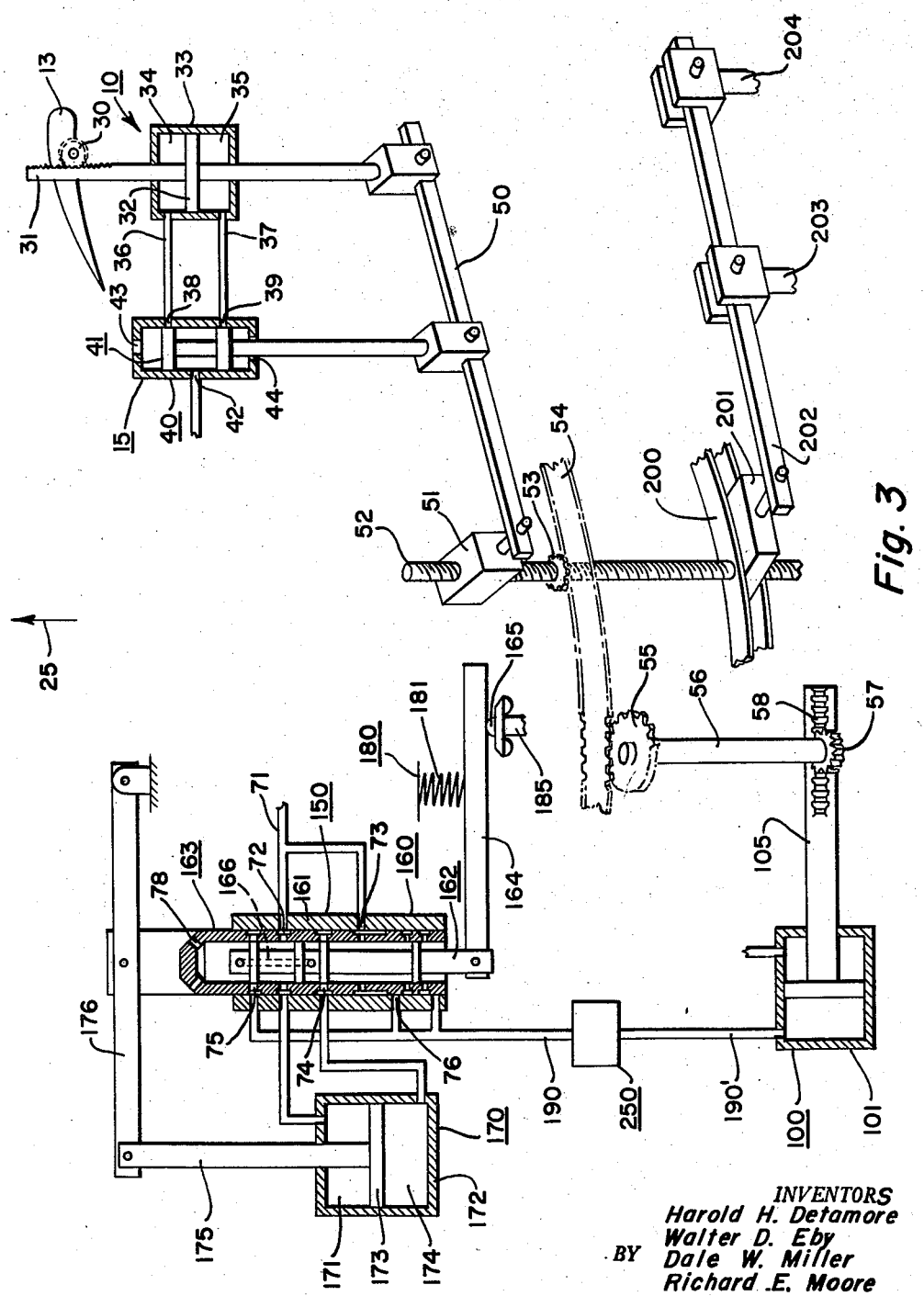
Fig. 3 is a schematic view of the governing means, the blade angle actuator in simplified form, and the mechanical coupling between various parts of the propeller organization.

With reference to Fig. 3, the means for coordinating and effecting coincident pitch adjustment of the blades in the inboard and outboard propeller elements will be described. In order to simplify the drawings, only the torque unit means and the distributor valve for the inboard propeller element are shown in Fig. 3, it being understood that a similar arrangement is employed in the outboard propeller element. Thus, the inboard propeller element 10 is shown schematically as including a blade 13 having attached thereto a pinion gear 30, which meshes with a rack 31 formed on one rod of a piston 32, The piston 32 is disposed within a cylinder 33 and constitutes the torque unit means for the inboard propeller element. Structurally, each propeller blade is operatively associated with a torque unit, the torque unit being of the type disclosed and claimed in copending application, Serial No. 359,104, filed June 2, 1953, in the name of Richard A. Hirsch now Patent No. 2,734,587. The piston 32 divides the cylinder 33 into an increase pitch chamber 34 and a decrease pitch chamber 35. The increase pitch chamber 34 is connected by a conduit 36 to a port 38 of the inboard distributor or control valve 40. The decrease pitch chamber 35 is connected by a conduit 37 to a port 39 of the distributor valve 40. The distributor valve includes a plunger 41 having spaced lands which control the flow of fluid through ports 38 and 39, the plunger 41 being connected to the intermediate point of a lever 50. The distributor valve 40 includes a supply port 42 and a pair of drain ports 43 and 44. Inasmuch as the valve elements are mounted within the regulator 15 and rotate with the propeller elements, some of the valve elements are responsive to centrifugal force, the direction of which is indicated by arrow 25 in Figures 2, 3 and 4. The piston 32 is also connected by another rod portion to one end of lever 50, this connection representing schematically the feedback mechanism of the inboard propeller element. The other end of lever 50 is connected to a nut 51 which threadedly engages a high lead screw 52. The high lead screw is driven by a pinion gear 53, which meshes with the internally geared surface of a ring gear 54. The externally geared surface of the ring gear 54, in turn, meshes with a pinion gear 55 attached to a shaft 56, which is rotated by means of a second pinion gear 57, which meshes with a rack 58.

The high lead screw 52 also threadedly engages a control ring 200 for effecting linear movement thereof. The control ring 200 receives a shoe 201, which is attached to one end of a lever 202, the intermediate point of which is attached to a plunger of the outboard distributor valve, not shown, by means of a rod 203, and the other end of which is attached to the piston rod 204 of the outboard torque unit means, not shown. Accordingly, rotation of the ring gear 54 by means of pinion gear 55 will effect rotation of high lead screw 52, which, in turn, will simultaneously position the distributor valve plungers of the inboard and outboard propeller elements so as to effect concurrent pitch adjustment of the inboard and outboard propeller element blades. The position of ring gear 54 is controlled by a blade angle actuator depicted by the numeral 100 in Fig. 3.

With particular reference to Fig. 2, the means for controlling the operation of the blade angle actuator 100 will be described. The control, or intelligence, system for the blade angle actuator is carried by the control unit of the regulator which rotates with the inboard propeller element. This control system includes a pressure reducing valve 60 comprising a cylinder 61 having disposed therein a spring loaded plunger 62. The cylinder 61 includes a pressure supply port 63, which is connected to the output of the pumps of the inboard propeller system, to be described. Suffice it here to say that a relatively high pressure obtains at the port 63 during propeller rotation. The piston 62 includes a throttling land 64 through which pressure fluid from port 63 is bled through a passage 65 to the outlet port 66 of the valve cylinder. The thrust of spring 67 acting on the plunger 62 is opposed by the thrust of centrifugal force in the direction of arrow 25, and the pressure existent at inlet port 63, so as to maintain a substantially constant pressure of 200 p. s. i. in conduit 70. If the pressure in conduit 70 exceeds 200 p. s. i., the piston 62 will be moved upwardly, as viewed in Fig. 2, so as to open drain port 68 and close supply port 63. However, when the pressure in conduit 70 is substantially 200 p. s. i., the drain port 68 will be closed and fluid flow will be admitted to the governing system through outlet port 66.

The hydraulic, or fluid pressure, governing assembly is indicated generally by the numeral 150, and comprises a centrifugally responsive governor valve assembly 160, a servo-motor 170, and an R. P. M. reset servo 180. The structural embodiment of this valve is disclosed and claimed in copending application, Serial No. 415,142, filed March 9, 1954, in the name of Virgil Battenburg, et al., and owned by the assignee of this invention. The function of the governing assembly 150 is to control the application of pressure fluid to and drain from a line 190, which has connection with the blade angle actuator 100 through conduit 190'.

The governor valve assembly 160 comprises a housing, or valve guide, 161 having disposed therein a centrifugally responsive piston element 162 and a movable valve sleeve 163. The piston 162 is pivotally connected at one end to a lever 164, which is supported on a roller 165 that provides a fulcrum for the piston 162. A force is applied to the lever 164 between the fulcrum point and the piston 162 by the R. P. M. reset servo 180 through a spring 181. The servo 180 includes a cylinder 182 having disposed therein a piston 183, which includes a rod having attached thereto a seat 184 for one end of the spring 181. As shown in Fig. 2, the piston 183 is in the cruise position wherein the governing speed is substantially 912 R. P. M. When the piston 183 is moved downwardly, as viewed in Fig. 2, so as to compress the spring 181, the governing speed will be at the maximum control speed of substantially 1002 R. P. M. The position of the piston 183 is controlled by a governor reset valve, to be described.

If desired, speed synchronization of the governing means 150 with other governing means on a multi-engine aircraft, may be accomplished by movement of a synchronizing lever, which is attached to a carriage 185 for the roller 165 by means of a rod 186. By movement of the rod 186, the position of the fulcrum point constituted by the roller 165 may be altered, by which means the propeller R. P. M. may be adjusted. If desired, jitter for preventing sticking between the piston 162 and the sleeve 163 may also be applied to the rod 186.

Conduit 70 is connected by a branch conduit 71 to a pair of inlet ports 72 and 73 of the governor valve assembly 160. As is seen in Fig. 2, inlet port 72 is always connected through port openings in the sleeve 163 and an annular channel between a pair of lands on the piston 162, to the rod end chamber 171 of a cylinder 172. The cylinder 172 constitutes part of the servo-motor 170 within which a piston 173 is disposed. The head end chamber 174 of the cylinder 172 is connected to a port 74 in the valve sleeve 163. The rod 175 of the piston 173 is pivotally connected to one end of a lever 176, the other end of which is pivotally connected to suitable supporting structure. The intermediate point of lever 176 is operatively connected with the valve sleeve 163. From an inspection of Fig. 2, it will be apparent that the pressure in rod end chamber 171 is the constant low pressure obtained from conduit 70. Movements of the piston 173 are effected by the supply or drain of fluid from head end chamber 174.

As stated hereinbefore, the function of the governor valve assembly 160 is to control the flow of fluid through ports 75, 76 and 77 to and from the increase pitch conduit 190, which is connected to the blade angle actuator 100. Accordingly, the operation of the governing means 150 will be explained by assuming that the propeller elements are rotating at a speed exceeding the selected governing speed. Inasmuch as the speed of propeller rotation determines the thrust of centrifugal force, and the piston 162 is responsive to the thrust of centrifugal force, an increase in speed will cause the piston 162 to move in the direction of arrow 25, in Fig. 2, relative to the sleeve 163. When the piston 162 moves upwardly, ports 72 and 75 will be placed in communication and fluid will flow from conduit 71 through ports 72 and 75 to conduit 190. With the valve arrangement disclosed, this flow of fluid from port 72 through port 75 will be acceleration increase flow. Upward movement of the piston 162 will also open port 74 and admit speed increase flow to chamber 174 of servo-motor 170. Inasmuch as a constant pressure is applied to the smaller surface of piston 173, the application of pressure fluid to chamber 174 will move the piston 173 upwardly, which, through lever 176, will move the sleeve 163 upwardly so as to cause the sleeve 163 to follow up the movement of piston 162. When sleeve 163 begins its upward movement, it will be observed that ports 73 and 76 will be placed in communication. With the valve arrangement disclosed, flow of fluid between ports 73 and 76 is proportional to the amount of speed error, or speed sensitive and, hence, speed sensitive fluid flow will be communicated to conduit 190. When the sleeve 163 moves throughout the same distance as piston 162 has moved due to the thrust of centrifugal force, port 75 will again be closed so as to block acceleration sensitive flow to conduit 190. At this time, the pitch of the propeller blades has been adjusted by the torque units to a position wherein the speed of the rotating propeller has reached a maximum and is about to decrease due to an increase in the pitch position of the blades. Accordingly, there is no longer a rate of change of speed error and, thus, there is no acceleration sensitive flow from the governor valve assembly. However, the speed error flow between ports 73 and 76 will continue because the sleeve 163 is in an overspeed position with reference to the valve housing 161. As the speed of the rotating propeller decreases due to the pitch position of the blades being increased, the centrifugally responsive piston will move downwardly, as viewed in Fig. 2, so as to expose port 75 to drain through port 78 in the valve sleeve 163. Moreover, port 74 will be connected to port 78 through a passage 166 in the piston 162 so that chamber 174 of the servo-motor 170 will be exposed to drain. The drain of fluid through port 75 to port 78 is termed deceleration decrease flow. As chamber 174 is connected to drain, the piston 173 will move downwardly, as viewed in Fig. 2, so that the sleeve 163 will follow the downward movement of the piston 162, and when the onspeed position is reached by the sleeve and piston, due to onspeed operation of the propeller element, both deceleration decrease flow to drain through ports 75 and 78 and overspeed increase flow between ports 73 and 76 will be blocked and the propeller will be rotating at the selected speed.

Conduit 70 also connects with a branch conduit 79, which connects with a beta selector valve indicated generally by the numeral 250. The beta selector valve is structurally disclosed in the previously mentioned copending application, Serial No. 404,346, filed January 15, 1954, and actually comprises two valves combined in one assembly, namely a rotary selector valve and a governing-beta selector valve. The beta selector valve performs the following functions: (1) controls feathering operation of the propeller elements; (2) controls blade angle in the negative thrust regime; (3) controls the R. P. M. reset servo 180; and (4) operates as a selector valve between the negative blade angle regime and the governing regime. In order to more clearly describe and show the several functions of the rotary selector valve, the valve is depicted in Fig. 2 by five separate valves, namely a feathering selector valve 260, a feathering selector control valve 270, a negative transition valve 280, a beta distributor valve 290, and a governor reset control valve 300. The governing and beta selector valve is indicated by numeral 310 in Fig. 2.

It may be seen that conduit 79 connects with the valves 260, 270, 280, 290, 300 and 310. The governing and beta selector valve 310 is a linear type valve comprising a housing having disposed therein a piston 311, which is urged upwardly, as viewed in Fig. 2, by means of a spring 312. The housing of the governing and beta selector valve 310 includes a port 313, which connects with conduit 190, a port 314 which connects with a conduit 80, a port 315 which communicates with a conduit 81, a port 316 which communicates with a conduit 82 and a port 317 which communicates with the feathering selector valve 260. The function of the governing and beta selector valve 310 is to port flow to the blade angle actuator 100 from either conduit 190 or conduit 81.

The valve 290, as shown, is connected by rod 320 to the intermediate point of a lever 330. One end of the lever 330 is connected by linkage 331 to a pilot's control lever 332, and the other end of lever 330 is operatively connected to a nut 333 which threadedly engages a high lead screw 334. The high lead screw 334 has attached thereto a pinion gear 335 which meshes with the internally toothed surface of ring gear 54.

The valve 270 is shown connected by a mechanical linkage 270a which has a cam follower disposed in a cam slot 270b of cam plate 370. The valve 280 is shown connected by a linkage 280a having a cam follower disposed in a cam slot 280b of the cam plate 370 and the valve 300 is shown connected by linkage 300a having a follower disposed in a slot 300b in the cam plate 370. The cam plate 370 can be reciprocated by movement of the control lever 332 through a rod 371. The control lever 332 has a range of negative thrust range indicated by letter N, a governor range indicated by letter G having a maximum control speed position depicted by letter M and a feather position depicted by letter F. During movement of the lever 332, the valve 290 is continuously adjusted through rod 320, lever 330 and the linkage 331. However, since the negative transition valve 280 only connects line 80 to drain when it is moved downwardly due to movement of the cam plate 370 to the left as viewed in Figure 2, the connection between line 81 and line, or conduit 190' remains blocked by plunger 311 of the selector valve 250 whereby the valve 290 does not control the operation of the blade angle actuator 100.

When the control lever 332 is moved to the feathering position, the plunger of the feathering selector control valve 270 will be moved upwardly, as viewed in Fig. 2, so as to apply low pressure fluid from conduit 79 through port 271 to conduit 272, which communicates with the housing of the feathering selector valve 260. The control valve 270 is moved upwardly by movement of the cam plate 370 to the right as viewed in Figure 2 so that the follower of linkage 270a engages the upper leg of the cam slot 270b. The feathering selector valve 260 is shown schematically as comprising a spring loaded plunger 261 having spaced lands for controlling the flow of fluid between ports 262 and 263. Port 262 is connected to conduit 79, and port 263 is connected to conduit 190', and the blade angle actuator 100. Thus, when the plunger of the feathering selector control valve 270 is moved upwardly by the lever 332 through linkage 331, lever 330 and linkage 320, low pressure fluid will be applied through conduit 272 so as to move the plunger 261 downwardly and interconnect ports 262 and 263. Thus, low pressure fluid will be admitted to the blade angle actuator, to be described, so as to move the actuator piston to the feathered position. The feathering selector control valve 270 is shown in the position it assumes when the control lever is in either the governing or negative beta regimes since the cam follower or linkage 270a engages the lower leg of cam follower 270b.

The function of the negative transition valve 280 is to control the governing and beta selector valve 310. Thus, when the control lever 332 is in either the governing or feathering position, the plunger of the negative transition valve 280 will be in the position shown in Fig. 2 since the cam follower of linkage 280a engages the upper leg of the cam slot 280b, wherein low pressure fluid from conduit 79 is applied through conduit 80 to the housing of the governing and beta selector valve 310 so as to move the plunger 311 to the position shown in Fig. 2. As the control lever 332 is moved out of the governing position and into the negative thrust position, the plunger of valve 280 will be moved downwardly since the cam follower of linkage 280a will engage the lower leg of the cam slot 280b, so as to connect conduit 80 to drain whereby the spring 312 will move plunger 311 upwardly so as to interconnect conduits 81 and 190'. Upward movement of the plunger 311 also connects conduit 82 to drain through port 316. In this position, the blade angle actuator 100 is under the control of the beta distributor valve 290. Accordingly, any angle in the negative thrust regime may be selected by positioning control lever 332 to adjust the position of the plunger in the beta distributor valve 290, and the beta distributor valve plunger will be repositioned by the feedback mechanism constituted by ring gear 54, pinion gear 335, high lead screw 334, nut 333, and lever 330.

The function of the governor reset control valve 300 is to control the flow of fluid pressure to the R. P. M. reset servo 180. When the control lever 332 is moved to the maximum control speed position, the plunger of reset control valve 300 will be moved upwardly so as to apply low pressure fluid from conduit 83 through conduit 84 to the cylinder 182. The control valve 300 is moved upwardly since the cam follower on linkage 300a engages the upper leg of cam slot 300b when the control lever 332 is moved to the maximum control speed position designated by M in the governing range. In this manner, the load on lever 164 will be increased by increasing the stress on spring 181, so as to require a higher propeller R. P. M. to maintain the onspeed position of the centrifugal governor valve piston 162. When the control lever is moved to the cruise position, the plunger of valve 300 will assume the position shown in Fig. 2, wherein the cylinder 182 will be connected to drain and the spring 181 will force the piston 183 against the end of the cylinder wall so as to reduce the force applied to lever 164, at which time, the propeller will operate at the cruising speed.

The blade angle actuator 100, as depicted in Figure 2, will next be described. The structural embodiment of the blade angle actuator 100 is disclosed and claimed in copending application, Serial No. 371,814, filed August 3, 1953, in the name of Harold H. Detamore et al., now Patent No. 2,768,612. Suffice it here to say that the blade angle actuator comprises a cylinder 101 having disposed therein two movable pistons 102 and 103, and a movable sleeve piston 104. Piston 102 may be termed the low pitch stop piston, while piston 103 may be termed the actuator piston. Piston 103 includes a rod portion 105 which has formed thereon the rack 58. Accordingly, the position of piston 103 will determine the relative angular position of ring gear 54, and each position of the piston 103 represents a definite blade angle position of the inboard and outboard propeller elements. The rod end surface of the piston 103 is exposed to the constant pressure of conduit 70 through conduit 85 and port 106 of the actuator cylinder 101. The fluid acting on the head end surface of piston 103, which is admitted through conduit 190', is either supplied or drained by the governor valve assembly 160 or the beta distributor valve 290, dependent upon the position of the pilot's control lever 332. Inasmuch as the rod end surface of the piston 103 is exposed to a substantially constant pressure, it will be appreciated that a reciprocable movement of the piston 103 may be effected by the supply and drain of fluid to the head end surface of piston 103.

The low pitch stop piston 102 includes a rod portion 107, which limits the low angle position of the propeller blades when the control lever 332 is in the governing position. Moreover, two low pitch stops are provided inasmuch as a dual low pitch stop valve assembly 350, to be described, is included in the control system of Fig. 2. The low pitch stop piston 102 also has surfaces of unequal areas, the larger area of which, or head end, is exposed to substantially constant pressure fluid from conduit 70 through conduit 82, at all times except when the control lever 332 is moved to the negative beta regime. The rod end of the piston 102 is exposed to fluid pressure as controlled by the dual low pitch stop valve assembly 350, through conduit 86 and port 108. The function and operation of the dual low pitch stop valve assembly and the low pitch stop piston 102 will be described more fully hereinafter.

The sleeve piston 104 is capable of combined mechanical and fluid pressure actuation to the left, as viewed in Fig. 2, by movement of the low pitch stop piston 102 and fluid pressure from conduit 190' if conduit 86 is connected to drain, and can be moved by the combined effects of piston 102 and fluid pressure from conduit 86 to the right, as viewed in Fig. 2. The sleeve piston 104 has a passage 106a which connects with the port 106 when the sleeve piston 104 abuts the right hand end of the cylinder 101 as shown in Figure 2, the passage 106a preventing interruption of the connection between the port 106 and the rod end of the piston 103. As stated hereinbefore, the function of the piston 102 and the sleeve piston 104 is to provide mechanical flight and ground low pitch stops for the working piston 103, as controlled by the dual low pitch stop valve 350.

The dual low pitch stop valve 350 is functionally equivalent to the valve assembly disclosed and claimed in the aforementioned copending application, Serial No. 269,672 now Patent No. 2,798,563. As shown, the dual low pitch stop valve assembly comprises a valve housing 351 having disposed therein a movable piston, or plunger, 352 and a movable sleeve 353. The only function of the dual low pitch stop valve assembly is to connect conduit 86 either to drain or to conduit 70, which determines the position of low pitch stop piston 102 within the actuator cylinder. The sleeve 353 is normally urged by a spring 354 to the position shown in Fig. 2. The sleeve 353 has formed therein a supply port 355 and a distribution port 356. The piston 352 includes spaced lands, one of which cooperates with the ports 356. The piston 352 is also provided with an axial passage 357 for a purpose which will appear hereinafter. The rod of piston 352 carries a pin 358 which rides in a cam surface 359 of a lineally movable cam plate 360. The structural embodiment of the cam plate is more fully described in the aforementioned copending application, Serial No. 404,346, filed January 15, 1954, and suffice it here to say that the cam plate 360 is operatively associated with the blade angle actuator so that movement thereof positions the cam plate in accordance with the pitch position of the propeller blades.

The valve housing 351 includes a supply port 361 and a distribution port 362. The operation is briefly as follows: With the valve assembly 350 in the position as shown in Fig. 2, the actuator 100 is conditioned to establish the flight low pitch stop of substantially 10° positive pitch, which prevents the propeller from producing a negative thrust when the aircraft is landing. In this instance, it will be apparent that movement of the piston 103 is limited by the piston rod 107 to the left, as viewed in Fig. 2, which movement represents a decrease in the blade angle of the propeller blades. The piston 102 is maintained in the position depicted in Figure 2 since it engages sleeve piston 104 which is in engagement with the end of the cylinder 100, the head end chamber of the piston 102 being subjected to the pressure in conduit 82. After the pilot has landed, the manual control lever 332 may be operated to select an angle in the negative thrust regime below a positive 5°, and in so doing, the cam plate 360 will move to the left, as viewed in Fig. 2, thereby moving piston 352 upwardly, so that fluid under pressure from conduit 70 will be admitted through ports 355 and 356 to the upper surface of sleeve 353, whereupon the sleeve 353 will be moved downwardly so as to interconnect ports 361 and 362, whereupon the low pitch stop piston 102 will be moved to the left to position the stop plug 107' against the rod of sleeve piston 104, thereby permitting an additional movement of the piston 103 to the left. The piston 102 can move to the left when the control lever 332 is in the negative thrust range, since conduit 82 is connected to drain through port 316 of valve 250 at this time.

To again condition the dual low pitch stop valve 350 and the actuator 100 to establish the flight low pitch stop, it will be assumed that the several parts are in a position establishing the ground low pitch stop, of substantially 5° positive pitch. The ground low pitch stop angle is that angle which prevents the existence of positive thrust when the aircraft is on a landing surface. As the blade angle is increased, the piston 352 is moved downwardly by reason of the cam plate 360 moved to the right, as viewed in Fig. 2. Accordingly, the port 356 is opened to the space above the piston 352 and oil will drain through passage 357 to the reservoir, in which instance, the spring 354 will move the sleeve 353 to the position shown in Fig. 2. Moreover, in consequence of the sleeve 353 assuming the position shown in Fig. 2, the conduit 86 will be connected to drain through port 362, and, hence, the low pitch stop piston 102 of the actuator 100 will assume the position shown in Fig. 2.

Figure 4:
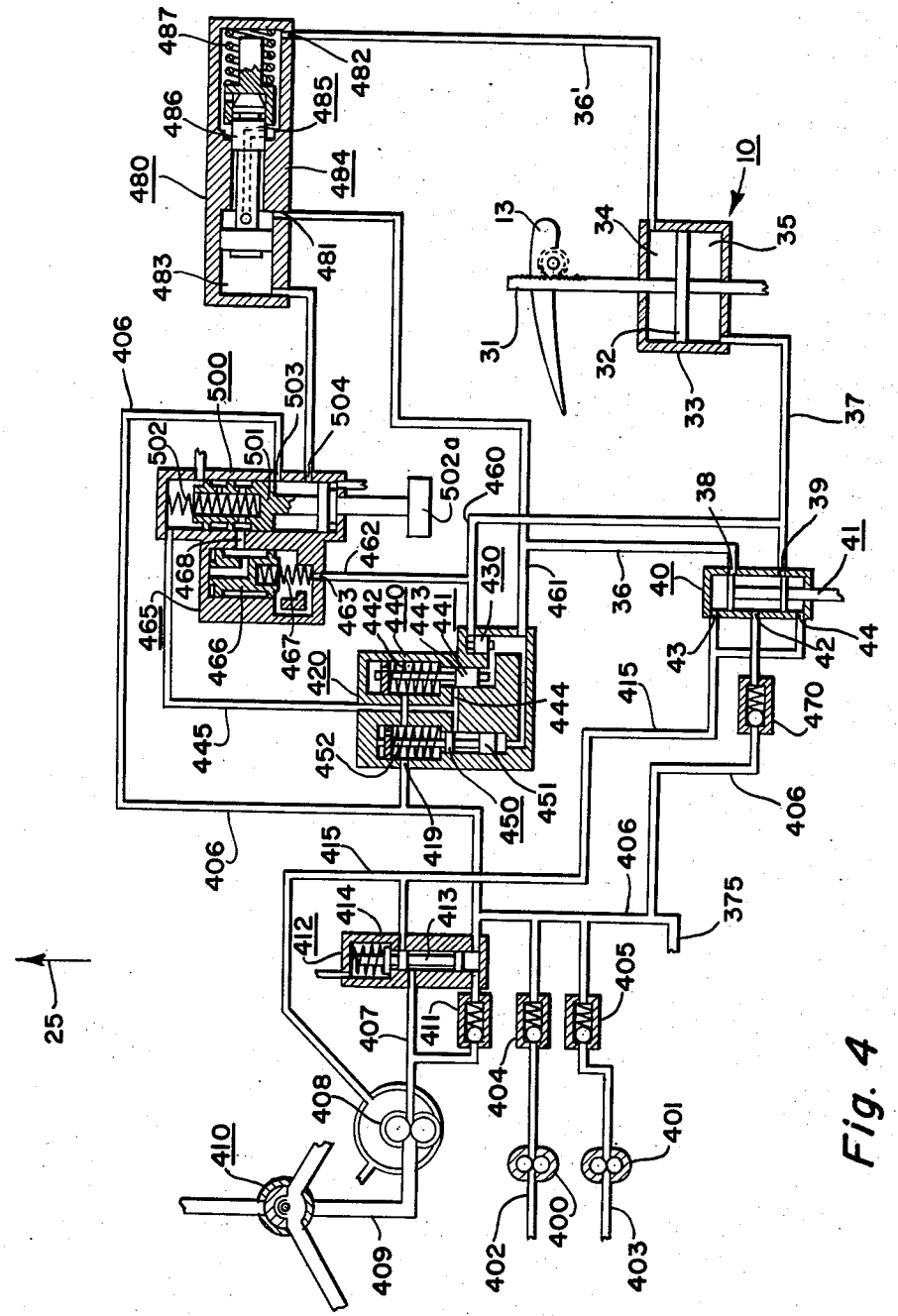
Fig. 4 is a schematic view of the high pressure fluid system for adjusting the pitch position of the propeller blades in both the inboard and outboard propeller elements.

With particular reference to Fig. 4, the fluid pressure system for both the inboard and the outboard propeller elements 10 and 20 will next be described. Inasmuch as the fluid pressure systems for actuating the torque units for both the inboard and outboard propeller elements are identical, only one system is shown in the drawings. However, it is to be understood that each propeller element includes such a system within its housing of the regulator 15. As shown in Fig. 4, the high pressure system for actuating the torque units includes a pair of pumps 400 and 401, which are driven continuously during propeller rotation. The pumps 400 and 401 have inlets 402 and 403 connected to the reservoir of the regulator 15 and outlets which discharge through check valves 404 and 405 to a high pressure trunk line 406. Each system also includes an electric motor driven feathering pump 408, which has an inlet 409 connected with a rotary inlet valve 410 of the type disclosed and claimed in copending application, Serial No. 297,066, filed July 3, 1952, in the name of Darrell E. Royer, now Patent No. 2,747,593. Inasmuch as the electric motor driven pump 408 must operate when the propeller is stationary, the rotary inlet valve 410 is required to assure that the inlet opening 409 of the pump is always immersed in liquid, as is more particularly pointed out in the aforesaid application. The output of the feathering pump 408 is discharged through a check valve 411 and into the high pressure trunk line 406. The electric motor drive pump 408 may be controlled by a centrifugal switch, as is well known in the art, but as the output of this pump is only necessary when insufficient flow is produced by the direct driven pumps 401 and 402, a feathering pump control valve 412 is connected to the output thereof. The feathering pump control valve 412 includes a piston 413, which is urged in one direction by a spring 414a and by the pressure potential in conduit 406 in the opposite direction. When the pressure in conduit 406 is above approximately 450 p. s. i., the plunger 413 will be moved upwardly, as viewed in Fig. 4, so that flow from the feathering pump 408 will bypass the check valve 411 and flow from conduit 407 through the valve 412 to a drain conduit 415. Thus, the feathering pump control valve 412 functions as an unloader for the pump 408, when the direct driven pumps 400 and 401 are producing sufficient flow and pressure to satisfy the requirements of the system.

As shown in Fig. 4, the trunk line 406 includes a branch 375, which connects with the supply port 63 of the pressure reducer valve 60. The connection 375 only exists in the fluid pressure system for the inboard propeller 10, and supplies high pressure fluid to the inlet port 63 of the pressure reducer valve 60 which supplies the low pressure fluid required by the governing and control system shown in Fig. 2. Thus, the fluid pressure system for the outboard propeller element 20 does not include this branch conduit 375, but in all other respects is identical to the system shown in Fig. 4.

The high pressure trunk line 406 communicates with a port 419 of a pressure control valve assembly 420. The pressure control valve assembly 420 comprises three valves, a shuttle valve 430, an equal area valve 440, and a pressure relief valve 450. The port 419 communicates with the equal area valve chamber of the valve assembly 420. The equal area valve 440 comprises a plunger 441 which responds to centrifugal force in the direction of arrow 25, movement in this direction being aided by a spring 442 and opposed by the pressure in trunk line 406 acting on the upper surface of land 443 of the plunger. The lower surface of land 443, which is equal to the upper surface thereof, is connected by the shuttle valve 430 by either conduits 460 or 461, to the higher of the pressure potentials existent in the torque unit chambers of the torque unit. Accordingly, the equal area valve 440 determines the pump operating pressure, and requires the pumping system to produce a pressure potential equal to the summation of the forces produced by the thrust of centrifugal force, the increase torque unit pressure in conduit 461 and force of spring 442. The land 443 controls a port 444 through which excess flow produced by the pumps 400 and 401 is bled into a conduit 445.

The pressure relief valve 450 comprises a plunger 451 having surfaces exposed to the pressure in trunk line 406 and the pressure in the increase pitch torque unit chamber through conduit 461. The plunger 451 is also urged upwardly by means of a spring 452. The function of the pressure relief valve 450 is to connect trunk line 406 with conduit 445 when the pressure in trunk line 406 exceeds a predetermined potential. If the pressure should rise above the predetermined potential, the plunger 451 will be moved downwardly, as viewed in Fig. 4, so as to interconnect conduits 406 and 445. High pressure conduit, or trunk line, 406 is also connected through a minimum pressure valve 470 to the supply port 42 of the distributor valve 40. The minimum pressure valve 470, as shown schematically, comprises nothing more than a check valve which does not open to supply pressure to port 42 until a predetermined minimum pressure, for instance 300 p. s. i., is attained in conduit 406. The distributor valve 40 comprises a valve guide, or housing, having the supply port 42 and a pair of control ports 38 and 39. The housing also includes a pair of drain ports 43 and 44, which are connected to the conduit 415. Flow of fluid from the supply port to the control ports is controlled by the plunger 41. Port 38 is connected to conduit 36 which connects with the conduit 461. Conduit 36 also connects with an inlet port 481 of a pitch lock valve 480, to be described. The outlet port 482 of the pitch lock valve 480 is connected through conduit 36' to the increase pitch chamber 34 of the torque unit. The port 39 is connected by conduit 37 to the decrease pitch chamber 35 of the torque unit.

Conduit 460, which connects with the decrease pitch line 37, includes a branch conduit 462, which connects with the outlet port 463 of a decrease pitch supply valve 465. The decrease pitch supply valve 465 comprises a cylinder having disposed therein a piston 466, which is urged to the position shown in Fig. 4 by a spring 467. The cylinder includes an inlet port 468 which is connected to the excess flow line 445 of the pressure control valve assembly 420. The function of the valve 465 is to supply oil to the decrease pitch line 37 and the decrease pitch chamber 35 so as to prevent voids therein when an exceptionally fast rate of decrease pitch occurs and the valve 40 is unable to supply sufficient oil through port 39. Inasmuch as the propeller blades have an inherent tendency, due to centrifugal and aerodynamic loadings, to move in the decrease pitch direction, the valve 465 is necessary to supply additional oil to the system. When the pressure in conduit 462 is reduced to substantially zero, the excess flow from conduit 445 will pass through port 468 and force the piston 466 downwardly so as to interconnect ports 468 and 463, thereby supplying oil to the decrease pitch line 37.

Each fluid pressure actuating system for the propeller units 10 and 20 also includes a pitch lock system comprising a pitch lock control valve 500 and the pitch lock valve 480. The arrangement and operation of this pitch lock system is similar to that disclosed and claimed in copending application, Serial No. 276,836, filed March 15, 1952, in the name of Dale W. Miller et al., now Patent #2,748,877. The pitch lock pilot valve 500 comprises a cylinder having disposed therein a piston 501, urged by means of a spring 502 in a downward direction, as viewed in Fig. 4. The piston 501 carries a weight element 502a so as to respond to centrifugal force in the direction of arrow 25 in a direction opposite to the thrust of spring 502. The cylinder of the pitch lock control, or pilot valve, 500 includes a supply port 503 connected to high pressure trunk line 406, and an outlet port 504 connected to a servo chamber 483 of the pitch lock valve 480. The piston 501 also has a surface exposed to the excess flow pressure from conduit 445, the arrangement being such that during normal operation of the pumping system, the excess flow from the pressure control valve assembly 420 will assist the spring 502 in maintaining the piston 501 in the position shown in Fig. 4, wherein ports 503 and 504 are interconnected. In this manner, as will appear more fully hereinafter, the system pressure will be sufficient to open the pitch lock valve 480 so as to decrease as well as increase propeller pitch. However, in the event of an oil loss due to leakage, or a failure of the direct driven pumps 400 and 401, the pressure control valve assembly 420 will not divert excess flow through conduit 445 so that the thrust of centrifugal force acting on the weighted piston 501 will move the piston upwardly so as to connect port 504 to drain, in which instance, the pitch lock valve 480 will seal the fluid in the increase pitch chambers of the torque units so as to prevent the pitch position of the blades from being reduced to a dangerously low angle by the combined effects of centrifugal and aerodynamic loading of the propeller blades.

The pitch lock valve 480 comprises a stationary cylinder 484, which is located in the propeller hubs at right angles to the direction of centrifugal force. The cylinder 484 contains a piston 485 having a piston head disposed in servo chamber 483 and a valving surface 486 for interconnecting ports 481 and 482. The piston 485 is normally urged to a position where communication between ports 481 and 482 will be blocked by means of a spring 487. A structural embodiment of the pitch lock valve 480 is disclosed and claimed in copending application, Serial No. 276,292, filed March 13, 1952, now abandoned, in the name of Kenneth L. Berninger et al., and suffice it here to say that when a sufficient pressure potential is maintained in servo chamber 483, communication may be had between ports 481 and 482 so as to increase, or decrease, the pitch position of the propeller blades. However, upon a failure occurring in the fluid pressure system, the valving surface 486 of the piston 485 will block communication between ports 481 and 482 so as to prevent further adjustment of the propeller blade pitch position.

*Summary of operation*

Inasmuch as the function and operation of the component parts of the fluid pressure system have been described hereinbefore, a brief resume of the operation is deemed to be sufficient to understand the present invention. When the pilot's control lever 332 is positioned in the governed speed regime, the governor valve assembly 150 will control flow of fluid to the blade angle actuator 100 so as to maintain substantially constant speed operation, at either the maximum control speed or at the cruise speed. During governor operation, fluid flow to the actuator, and, hence, fluid flow to the torque units by the distributor valves is effective to establish a rate of blade angle correction proportional to the amount of speed error and to the rate of change of speed error. Moreover, when the aircraft is air-borne, the dual low pitch valve assembly and the blade angle actuator 100 will be effective to prevent the blade angle position of less than the maximum safe low flight angle, for instance a positive 10°, irrespective of the demands of the hydraulic governor. Moreover, should the hydraulic system of either propeller fail, the pitch lock valves therein will maintain the propeller blades at a fixed pitch position.

When the aircraft has safely landed, the pilot may wish to reduce the angle of the blades to the ground low pitch stop, in which instance, it is only necessary to move the control lever 332 to the negative thrust regime, wherein the distributor valve 290 will control flow of fluid to the actuator 100. In this instance, when the pitch angle of the blades is reduced below the ground low pitch stop angle of substantially positive 5°, the dual low pitch stop valve assembly will be effective to position the actuator pitch stop piston so that when the controls are returned to governing, the blade angle may be reduced to the ground low pitch stop.

With the propeller control system disclosed, the pilot may choose an angle in the negative thrust regime, or beta regime, manually through movement of the lever 332 in the blade angle control range. Moreover, the pilot may select feathering operation of the propeller blades, in which instance, the lever 332 is operated so as to actuate feathering selector control valve 270.

From the aforegoing, it is manifest that the present invention provides a fluid pressure system particularly adapted to precisely control the pitch position of propeller blades. Moreover, the herein disclosed control system embodies an all hydraulic speed and acceleration sensitive governing mechanism, which is extremely reliable in operation. Furthermore, coincident pitch changes in the inboard and outboard propeller elements of a dual rotation propeller may be effected by using a single actuator to control the distributor valves of each propeller element, which actuator lends itself to the use of mechanical stops for establishing flight and ground low pitch positions for the propeller blades.

While the embodiment of the present invention as herein disclosed, constitutes a preferred form, it is to be understood that other forms might be adopted.

What is claimed is as follows:

1. Control mechanism for a variable pitch propeller having adjustable blades and having fluid pressure operated motor means for adjusting the pitch position of said blades, said blades being subject to external aerodynamic and centrifugal twisting moments which tend to move said blades in the decrease pitch direction, including in combination, means operable to produce a continuous supply of fluid pressure during rotation of said propeller, pressure regulating means operatively connected to said supply for maintaining a pressure potential of a predetermined value in excess of the demand for effecting pitch changes and for diverting said excess flow into a conduit, a valve interconnecting said supply and opposite sides of said motor means for controlling the application of pressure fluid to opposite sides thereof, and valve means operable to supply excess flow from said conduit to one side of said motor means so as to prevent the existence of a void in said one side of said motor means when the blades are being moved in a decrease pitch direction by the aerodynamic and centrifugal twisting moments.

2. In a control system for a variable pitch propeller having a governed speed regime, the combination including, a source of fluid pressure, servo-motor means for adjusting the pitch position of said propeller, a valve interconnecting said source and said servo-motor means for controlling the flow of pressure fluid therebetween, an actuator operatively connected to said valve for controlling the operation thereof, said actuator including a cylinder, a piston, and a mechanical stop for limiting movement of said piston in one direction, and fluid pressure actuated means for adjusting the position of said mechanical stop to thereby establish two low pitch stops for said propeller in the governed speed regime.

3. Governing apparatus for controlling the rotational speed of a prime mover including, in combination, a source of fluid pressure, a servo cylinder having disposed therein a piston which divides said cylinder into rod and head end chambers, means interconnecting the rod end chamber and said source of pressure at all times, a valve assembly for controlling fluid flow from said source to said cylinder, said valve assembly including a valve housing having a supply port connected with said source and a plurality of distribution ports, one of said distribution ports being connected with the head end chamber, and two cooperable valve elements, each movable relative to said valve housing for cojointly controlling the connection between said source port and said distribution ports, one of said valve elements being directly responsive to the rotative speed of said prime mover and movable by the thrust of centrifugal force produced thereby, means operatively connected to the other valve element for effecting movement thereof, a fluid pressure operated actuator for controlling the rotational speed of said prime mover, and passage means interconnecting said other distribution ports and said actuator whereby movements of said actuator are effected by combined fluid flow as controlled by said cooperable valve elements.

4. The combination set forth in claim 3 wherein the actuator includes a cylinder having disposed therein a reciprocable piston capable of fluid pressure actuation in either direction.

5. The combination set forth in claim 4 wherein the actuator piston includes surfaces of unequal area, the smaller area surface of said actuator piston being disposed in a chamber which is connected to said source of fluid pressure, and a larger area surface of said actuator piston being connected to said other distribution port so as to be exposed to the combined fluid flow of said valve assembly.

6. The combination set forth in claim 3 wherein the piston of said servo cylinder has surfaces of unequal area, the larger area of said servo piston being exposed to the cylinder chamber connected with said one distribution port, and the smaller area surface of said servo piston being disposed in the cylinder chamber which is connected to the source of fluid pressure.

7. The combination set forth in claim 3 wherein the two cooperable valve elements comprise a valve piston and a valve sleeve, and wherein the piston is responsive to the rotative speed of said prime mover, and the means operatively connected to the sleeve includes said servo piston.

8. Control mechanism for a variable pitch propeller having adjustable blades and having fluid pressure operated motor means for adjusting the pitch position of said blades, said blades being subject to external aerodynamic and centrifugal twisting moments which tend to move said blades in the decrease pitch direction, including in combination, a source of fluid pressure, a valve interconnecting said source and opposite sides of said motor means for controlling the application of fluid pressure to opposite sides thereof, a fluid pressure operated actuator connected to said source for actuating said valve, pressure regulating means connected to said source for controlling the pressure potential thereof and operable to divert excess fluid flow to a conduit, and valve means connected with said conduit and with one side of said motor means and operable to supply additional fluid to said one side of said motor means so as to prevent the existence of a void therein when said blades are being moved in a decrease pitch direction by the external aerodynamic and centrifugal twisting moments.

9. Control mechanism for a variable pitch propeller having adjustable blades and having fluid pressure operated motor means for adjusting the pitch position of said blades, said blades being subject to external aerodynamic and centrifugal twisting moments which tend to move said blades in the decreased pitch direction, including in combination, a source of fluid pressure, pressure regulating means connected with said source and operable to control the pressure potential thereof and divert excess fluid flow to a conduit, a valve connected with said source and with opposite sides of said motor means for controlling the application of pressure fluid to opposite sides thereof, first valve means connected with one side of said motor means and operable to trap fluid therein upon the failure of said source of fluid pressure, and second valve means connected with said conduit and with the other side of said motor means for supplying additional fluid to said other side of said motor means so as to prevent the existence of a void therein when said blades are being moved in a decrease pitch direction by the external aerodynamic and centrifugal twisting moments.

10. Control mechanism for a variable pitch propeller having adjustable blades and having fluid pressure operated motor means for adjusting the pitch position of said blades, including in combination, a source of fluid pressure, a fluid pressure operated actuator, governor valve means interconnecting said source and said actuator for controlling the operation thereof so as to maintain propellor speed substantially constant, said actuator including a cylinder having disposed therein a piston capable of fluid pressure actuation in either direction and operable to engage a stop which defines the limit of piston movement in one direction, servo actuated means for adjusting the position of said piston stop within said actuator to thereby establish two low pitch stops for said propeller when the pitch position of said propeller blades is under the control of said governor valve means, and valve means operatively connected to and operated by said actuator and operable to control flow between said source and said motor means for controlling the pitch position of said propeller blades as determined by the operation of said actuator.

11. Control mechanism for a variable pitch propeller of the type having an inboard propeller element and an outboard propeller element, each propeller element having adjustable blades with fluid pressure operated motor means for adjusting the pitch position thereof, and means for rotating said propeller elements in opposite directions, including in combination, a source of fluid pressure, a fluid pressure operated actuator, and valve means interconnecting said source and said actuator for controlling the operation thereof, said actuator comprising a cylinder having disposed therein a reciprocable piston capable of fluid pressure actuation in either direction and a mechanical stop engageable by said piston for limiting movement thereof in one direction, means for determining the position of said mechanical stop within said actuator, and valve means for both the inboard and outboard propeller elements for connecting the source of fluid pressure with said motor means as controlled by said actuator for varying the pitch position of the blades of both propeller elements concurrently.

12. In combination with a variable pitch propeller having fluid pressure operated means for adjusting the pitch thereof, a governor comprising, a control valve having a plunger element responsive to speed and movable by the thrust of centrifugal force produced thereby, said valve including a movable sleeve element having a plurality of spaced ports, said plunger element having a plurality of spaced lands cooperable with said ports, a servo cylinder having disposed therein a reciprocable piston capable of fluid pressure actuation in either direction, a pressure connection for said valve, a drain connection for said valve, said pressure connection communicating with said plunger between pairs of lands, said drain connection communicating with opposite ends of said sleeve on the other sides of the end lands on said piston, one of said ports being connected to said servo cylinder, another of said ports being connected to the pitch adjusting means, and means connecting the other side of said servo cylinder with the pressure connection, the construction and arrangement being such that fluid flow from the governor to the pitch adjusting means is proportional to the amount of speed error and the rate of change of speed error.

13. The combination set forth in claim 12 wherein the piston of said servo cylinder is of unequal area and divides said servo cylinder into a rod end chamber and a head end chamber, the head end chamber being connected to said one port of the control valve, and the rod end chamber being connected with a source of substantially constant pressure.

14. The combination set forth in claim 12 wherein the servo cylinder piston is operatively connected to said sleeve element, the construction and arrangement being such that movements of said plunger element are followed up by said sleeve element through the interconnection between said servo piston and said sleeve element.

References Cited in the file of this patent

UNITED STATES PATENTS

| 2,343,416 | Keller | Mar. 7, 1944 |
| 2,626,669 | Moore et al. | Jan. 27, 1953 |
| 2,632,516 | Longfellow | Mar. 24, 1953 |

FOREIGN PATENTS

| 562,845 | Great Britain | July 19, 1944 |